(12) United States Patent
Sopko, Jr. et al.

(10) Patent No.: US 8,326,499 B2
(45) Date of Patent: Dec. 4, 2012

(54) RETARDING CONTROL OF A MACHINE THROUGH POWER DISSIPATION THROUGH POWER SOURCE AND PARASITIC LOADS

(75) Inventors: Thomas M. Sopko, Jr., East Peoria, IL (US); Michael J. Barngrover, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 606 days.

(21) Appl. No.: 12/314,005

(22) Filed: Dec. 2, 2008

(65) Prior Publication Data

US 2010/0137102 A1 Jun. 3, 2010

(51) Int. Cl.
*F02D 13/04* (2006.01)

(52) U.S. Cl. .............................. 701/50; 701/36; 123/320

(58) Field of Classification Search .................... 701/36, 701/50, 51, 53, 54, 58–61, 99–102, 110; 123/41.11, 319, 320, 339.16, 349–352; 180/165
See application file for complete search history.

(56) References Cited

U.S. PATENT DOCUMENTS

| | | | |
|---|---|---|---|
| 3,621,822 A * | 11/1971 | Oster | 123/41.12 |
| 3,841,795 A * | 10/1974 | Ferre et al. | 417/216 |
| 3,999,386 A | 12/1976 | Crull et al. | |
| 4,462,479 A | 7/1984 | Steel | |
| 5,070,959 A | 12/1991 | Grabowski | |
| 5,816,665 A | 10/1998 | Burnett et al. | |
| 5,996,343 A | 12/1999 | Kuras | |
| 6,223,592 B1 * | 5/2001 | Genise | 73/115.02 |
| 6,330,873 B1 | 12/2001 | Letang et al. | |
| 6,537,177 B2 | 3/2003 | Degroot et al. | |
| 6,552,439 B2 | 4/2003 | Dunsworth et al. | |
| 6,620,077 B2 | 9/2003 | Carlson et al. | |
| 6,830,031 B2 * | 12/2004 | Sans | 123/352 |
| 6,842,689 B2 * | 1/2005 | Andres et al. | 701/110 |
| 6,986,727 B2 * | 1/2006 | Kuras et al. | 477/4 |
| 7,296,496 B2 | 11/2007 | Shah | |
| 7,798,277 B2 * | 9/2010 | Juricak et al. | 180/307 |
| 2007/0044453 A1 | 3/2007 | Strauser et al. | |
| 2008/0054647 A1 | 3/2008 | Kumar | |

* cited by examiner

*Primary Examiner* — Michael J. Zanelli
(74) *Attorney, Agent, or Firm* — Finnegan, Henderson, Farabow, Garrett & Dunner LLP

(57) ABSTRACT

A method for dissipating power through a machine may include directing power into a power system of the machine. The method may further include controlling a parasitic load of the power system to increase dissipation of the power system, the controlling of the parasitic load being a function of a power dissipation limit of the power system.

20 Claims, 3 Drawing Sheets

RETARDING CONTROL OF A MACHINE THROUGH POWER DISSIPATION THROUGH POWER SOURCE AND PARASITIC LOADS

TECHNICAL FIELD

The present disclosure relates generally to a control system and, more particularly, to a control system for controlling a CVT based power system of a machine.

BACKGROUND

Under certain circumstances, it may be desired to retard a machine's propulsion. For example, when a machine is travelling down an incline it may be necessary to retard the machine's propulsion in order to maintain a desired speed. In another example, during propulsion direction change events (e.g., forward to reverse) it may be desired to retard the machine's forward propulsion before propelling the machine in the reverse direction. Typically, the retarding event is initiated by adjusting the transmission (e.g, downshifting) to drive power from the traction members (wheels) back into the engine. The natural resistance of the engine then dissipates some of the transferred power, thereby retarding the machine. However, driving the power into the engine typically causes the engine speed to increase. When the engine speed increases above a maximum desirable engine speed, the engine's capacity to absorb power is limited to steady state frictional losses of the engine. As a consequence, the retarding rate of the machine decreases, requiring more time and a greater distance for the machine to slow down to the desired speed.

In order to maintain a retarding rate, accessories may be actuated to enhance engine dissipation capabilities. One such method is described in U.S. Pat. No. 6,330,873 ("the '873 patent") issued to Letang et al. on Dec. 18, 2001. During the retarding event, the system disclosed in the '873 patent dissipates power by increasing the exhaust stroke pressure of at least one of the cylinders to effect four degrees of engine braking which correspond to zero, minimum, moderate, or maximum power dissipation, respectively. When maximum power dissipation is requested, the system also increases engine accessory load by enabling a cooling fan in addition to modifying the exhaust stroke pressure. This allows the system to better control vehicle speed when descending long grades.

While the '873 patent may disclose a method to enable a cooling fan in order to achieve maximize engine power dissipation, improvements to engine retarding capabilities may be limited. In particular, the disclosed system of the '873 patent does not modulate the cooling fan based on engine dissipation parameters.

The disclosed system is directed to overcoming one or more of the problems set forth above and/or other problems in the existing technology.

SUMMARY

In one aspect, the present disclosure is directed toward a method for dissipating power through a machine. The method may include directing power into a power system of the machine to dissipate power. The method may further include controlling a parasitic load of the power system to increase dissipation of the power system, the controlling of the parasitic load being a function of a power dissipation limit of the power system.

In another aspect, the present disclosure is directed to a method for dissipating power through a machine. The method may include directing power into a power system of the machine. The method may also include determining a value approximating a power dissipation potential of the power system. The method may further include adjusting a magnitude of power consumed by one or more parasitic devices as a function of the dissipation potential value of the power system.

In yet another aspect, the present disclose is directed toward a power system. The power system may include a power source operably coupled to a transmission. The power system may further include one or more parasitic devices operably coupled to the power source. The power system may also include a controller configured to cause the transmission to direct power into the power source, determine a value approximating a maximum power dissipation potential of the power source, and control the one or more parasitic devices to dissipate power as a function of the determined maximum power dissipation potential of the power source.

DETAILED DESCRIPTION

Figure 1:
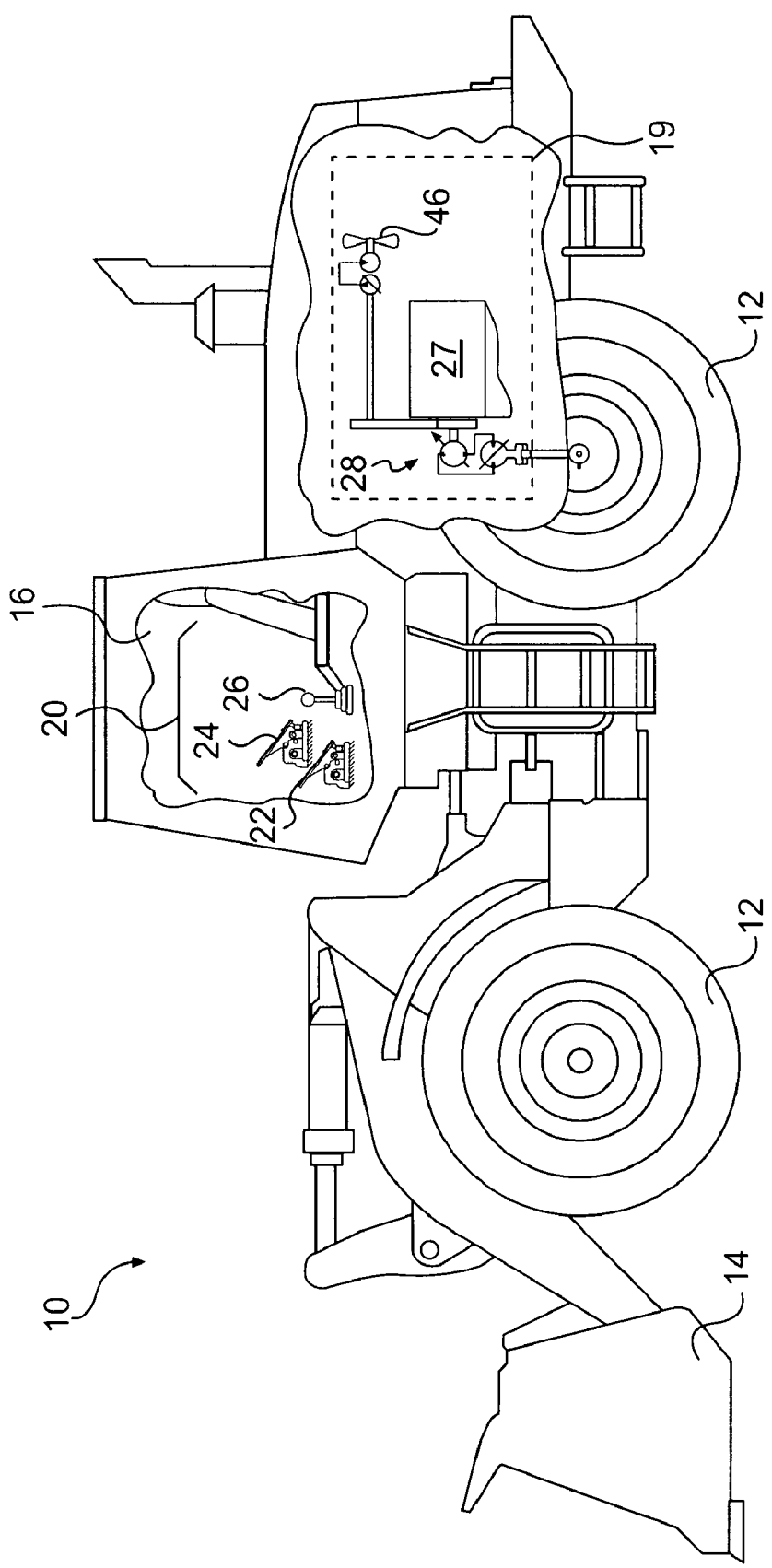
FIG. 1 is an illustration of an exemplary machine according to the present disclosure.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the wheel loader depicted in FIG. 1 or any other type of mobile machine known in the art. Machine 10 may include one or more traction devices 12, a work implement 14, an operator station 16, and a power system 19 including a transmission 28, power source 27, and a cooling fan 46.

Traction devices 12 may include one or more wheels located on each side of machine 10 (only one side shown) configured to allow translational motion of machine 10. Alternatively, traction devices 12 may include tracks, belts, or other traction devices known in the art. Any of traction devices 12 may be driven and/or steerable.

Implement 14 may include any device used to perform a particular task, such as, for example, a bucket, a blade, a shovel, a ripper, a hammer, a grappling device, or any other task-performing device known in the art. One or more work implements may be attachable to machine 10 and controllable from operator station 16. Implement 14 may be connected to machine 10 via a direct pivot or a linkage system and may be actuated via, for example, one or more hydraulic actuators. Implement 14 may pivot, rotate, slide, swing, lift, or move relative to machine 10 in any manner known in the art.

Operator station 16 may include devices that receive an input from a machine operator indicative of a desired machine travel maneuver. In one embodiment, operator interface devices 20 may include a left foot pedal 22, a right foot pedal 24, and a forward-neutral-reverse (FNR) selector 26. As an operator manipulates left foot pedal 22 and/or right foot pedal 24 (i.e., displaces left and/or right foot pedals 22 and 24 away from a neutral position), the operator may affect a corresponding machine travel movement. In addition, as the operator moves FNR selector 26 to a forward, reverse, or neutral position, the operator may affect a corresponding transmission operating mode such as, for example, forward, reverse, or idle. It is contemplated that operator interface devices other than foot pedals such as, for example, joysticks, levers, switches, knobs, wheels, and other devices known in the art, may additionally or alternatively be provided within operator station 16 for control of machine 10, if desired. Furthermore, FNR selector 26 may be omitted and other operator input devices may affect the transmission operating mode.

Figure 2:
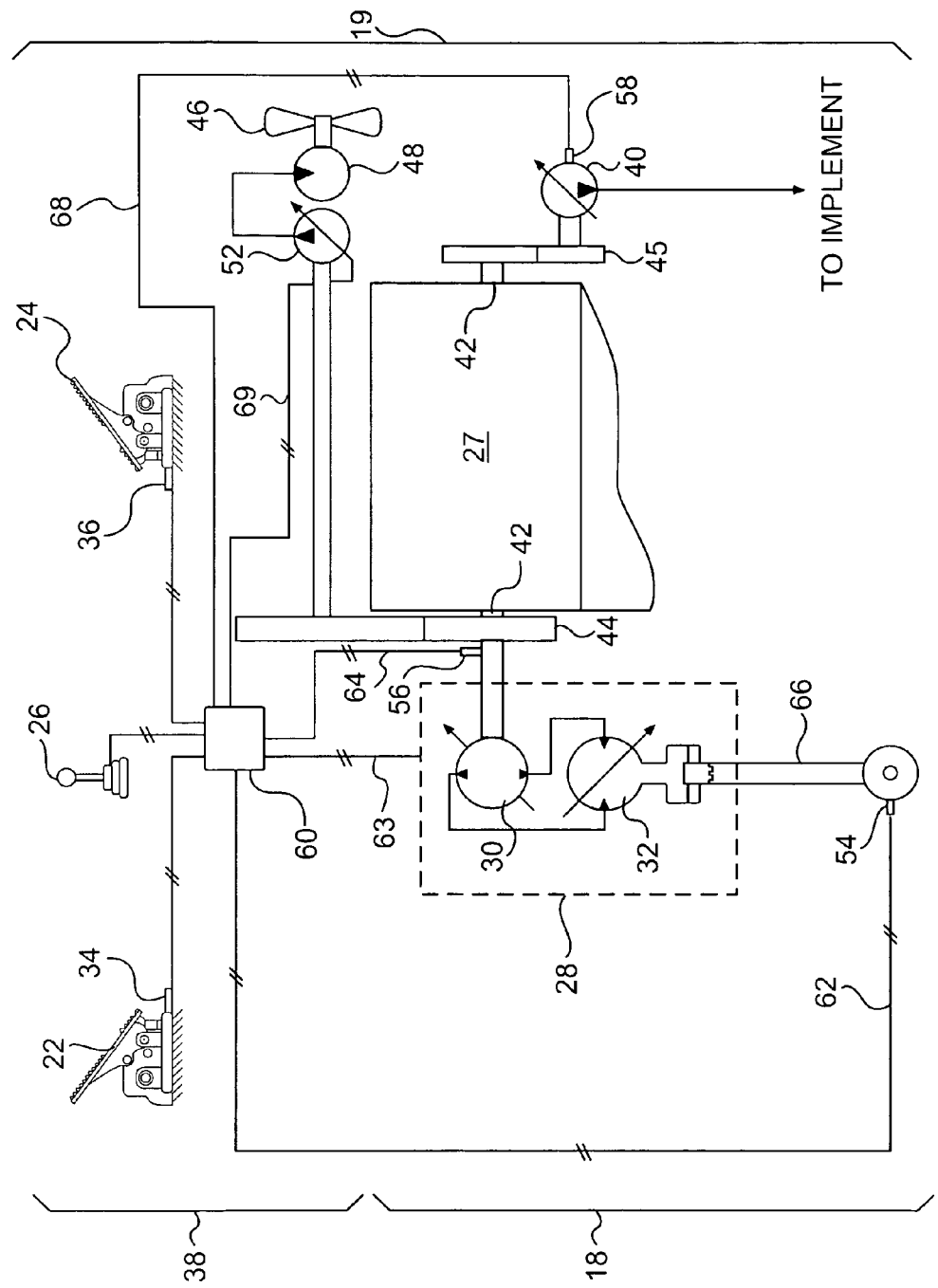
FIG. 2 is a diagrammatic illustration of a portion of a power system of the machine of FIG. 1.

As illustrated in FIG. 2, power system 19 may drive traction devices 12 (referring to FIG. 1) in response to various operator and environmental inputs. Power system 19 may include a powertrain 18, at least one hydraulic pump 40, a cooling fan 46, and a control system 38 for regulating the operation of power system 19 in response to one or more inputs.

Powertrain 18 may be an integral package configured to generate and transmit power to traction devices 12. In particular, powertrain 18 may include a power source 27 operable to generate a power output, and a transmission 28 to transmit the power output in a useful manner to traction devices 12. Power source 27 may embody a combustion engine, such as a diesel engine, a gasoline engine, a gaseous-fuel-powered engine (e.g., a natural gas engine), or any other type of combustion engine known in the art. Transmission 28 may embody a continuously variable transmission such as, for example, a hydraulic continuously variable transmission or a hydro-mechanical continuously variable transmission.

In the exemplary hydraulic continuously variable transmission of FIG. 2, a driving element 30 may include a pump, such as a variable displacement pump, and a driven element 32 may include a fluid motor, such as a variable displacement fluid motor. Driven element 32 may be fluidly connected to driving element 30 by conduits that supply and return fluid to and from driving element 30 and driven element 32, allowing driving element 30 to effectively drive driven element 32 by fluid pressure.

Transmission 28 may be at least partially controlled with left 22 and right 24 foot pedals. That is, as left 22 and right 24 foot pedals are manipulated by an operator, the foot pedals may provide electric signals signifying a desired driven element 32 output such as, for example, a desired torque output and/or a desired speed of machine 10. For example, left and right foot pedals may have a minimum position and be movable through a range of positions thereof and produce corresponding signals responsive to the displaced positions. Sensors 34 and 36 may be any sensor capable of sensing the displacement of foot pedals such as, for example, a switch or potentiometer. The displacement signals from each of sensors 34, 36 may be directed through a control system 38 to transmission 28 via a torque command to control the torque output of driven element 32.

Hydraulic pump 40 may be operatively connected to power source 27, and driven by a crankshaft 42 of power source 27. Hydraulic pump 40 may be connected with crankshaft 42 in any manner readily apparent to one skilled in the art where rotation of crankshaft 42 may result in a corresponding rotation of a pump shaft of hydraulic pump 40. For example, hydraulic pump 40 may be connected to crankshaft 42 through a gear train 45.

Hydraulic pump 40 may be configured to produce a flow of fluid at a particular discharge pressure, and therefore may consume a portion of the available power produced by power source 27. Hydraulic pump 40 may include a fixed or variable displacement pump, a variable flow pump, or any other device for pressurizing a flow of fluid known in the art. Hydraulic pump 40 may pressurize fluid for use in, for example, an implement circuit (not shown) associated with an implement 14.

Power system 19 may further include one or more parasitic devices operably coupled to power source 27. The one or more parasitic devices may be defined as any device that can be controlled to variably consume a portion of the available power produced by power source 27. One example of a parasitic device may include a cooling fan 46 driven by a variable displacement pump 52 connected to crankshaft 42 via, for example, gear train 44. Variable displacement pump 52 may be configured to pressurize fluid to drive a hydraulic motor 48 fixedly connected to cooling fan 46. Variable displacement pump 52 may include a pump-flow modifying component (not shown) such as a swash plate configured to vary the stroke of one or more pistons associated with the pump. By varying the stroke of the one or more pistons, pump flow to hydraulic motor 48 may be increased, as desired, to control the operation of cooling fan 46.

Control system 38 may regulate the operation of power system 19 and may include sensors 54, 56, and 58 for sensing various parameters indicative of the ground speed, speed of power source 27, and load of hydraulic pump 40, respectively. Control system 38 may also include a controller 60 for regulating operation of power system 19 in response to operator requests, environmental inputs, and signals received from sensors 54, 56, and 58. It is contemplated that control system 38 may include additional sensors for sensing other parameters that may be useful for operation of power system 19.

Sensor 54 may be associated with transmission 28 and/or traction devices 12 to sense an output of transmission 28 and/or a ground speed of machine 10 and may be in communication with controller 60 via a communication line 62. In one example, sensor 54 may embody a magnetic pickup type of sensor associated with a magnet embedded within a rotational component of powertrain 18 such as a transmission output shaft 66. During operation of machine 10, sensor 54 may sense the rotating magnetic field produced by the magnet and generate a signal corresponding to the rotational speed of transmission 28 and/or the corresponding ground speed of machine 10.

Sensor 56 may be associated with power source 27 to sense an output speed thereof and may be in communication with controller 60 via a communication line 64. In one example, sensor 54 may embody a magnetic pickup type of sensor associated with a magnet embedded within a rotational component of power source 27 such as crankshaft 42 or a flywheel (not shown). During operation of power source 27, sensor 56 may sense the rotating magnetic field produced by the magnet and generate a signal corresponding to the rotational speed of power source 27. It is contemplated that sensors 54, 56 may embody any other type of sensor known in the art.

Sensor 58 may be associated with hydraulic pump 40 to sense a parameter of hydraulic pump 40. Sensor 58 may be in communication with controller 60 via a communication line 68. In one embodiment, sensor 58 may be a pressure sensor and/or a pump displacement sensor associated with hydraulic pump 40. During operation of machine 10, sensor 58 may monitor the discharge pressure and/or displacement of hydraulic pump 40 and generate a signal corresponding to the discharge pressure and/or displacement of hydraulic pump 40. Controller 60 may be configured to derive, based on signals received from sensor 58, a load exerted by hydraulic pump 40 on power source 27.

Controller 60 may embody a single microprocessor or multiple microprocessors for controlling the operation of power system 19 in response to operator requests and signals received from sensors 54, 56, and 58. Numerous commercially available microprocessors can be configured to perform the functions of controller 60. It should be appreciated that controller 60 could readily embody a general machine microprocessor. Controller 60 may include a memory, a secondary storage device, a processor, and any other components for running an application. Various other circuits may be associated with controller 60 such as power supply circuitry, signal conditioning circuitry, solenoid driver circuitry, and other types of circuitry.

As mentioned above, controller 60 may be configured to receive various operator requests. For example, operator may manipulate left pedal 22, right pedal 24, and/or FNR selector 26 to generate an signal indicative of a desired speed. The desired speed may include maintaining a particular positive speed of machine 10, decelerating to zero speed, or decelerating to zero speed and accelerating to positive speed in a direction opposite the movement of machine 10 (i.e., a direction change from forward to reverse). Controller 60 may receive such signals from the actuated interface devices 20 or from sensors 34, 36. Controller may determine a speed command in response to the operator request. Typically, the speed command may correspond to the signals received from interface devices 20. Alternatively, controller 60 may convert the signal received from interface devices 20 into the speed command by scaling it or performing other well-known processing or conversion operations.

Controller 60 may calculate a torque command based on the difference between the speed command and the actual (sensed) output speed of transmission 28 received from sensor 54. The torque command may be calculated using a proportional control algorithm, a proportional plus integral (PI) control algorithm, or a proportional plus integral and derivative (PID) control algorithm, and/or any other algorithm known to one skilled in the art. Additionally and/or alternatively, one or more maps, charts, graphs, etc. may be stored in the memory of controller 60 for interpreting the signals indicative of the operator's request and determining the corresponding torque command. Controller 60 may transmit the torque command, via communication line 63, to transmission 28 to control one of driving element 30 (i.e., the displacement of the variable displacement pump) and driven element 32 (i.e., the displacement of the variable displacement motor).

In a retarding event, the desired speed of machine 10 may be less than the ground speed of machine 10. In such instances, controller 60 may generate a retarding torque command. A controller (not shown) associated transmission 28 may receive the torque command signal and responsively control one of driven element 32 and driving element 30 so that transmission 28 may direct retarding power from traction devices 12 through transmission 28 and back to power source 27.

As retarding power may be received from traction devices 12, the retarding power may be applied to driven element 32 of transmission 28. In this process, driven element 32 may operate as a driving element, such as a variable displacement pump, and produce pressurized fluid. The pressurized fluid generated by driven element 32 may then be supplied to driving element 30 (which now may operate as a driven element such as a hydraulic motor) of transmission 28 for driving crankshaft 42 of power source 27. All or a portion of the retarding power may be dissipated through rotational movement of crankshaft 42 of power source 27. In particular, the retarding power may be dissipated by the natural engine friction, exhaust restrictors, and compression release devices associated with power source 27. Additionally, a portion of the retarding power may be dissipated through driven accessories of power source 27 such as, for example, hydraulic pump 40 and cooling fan 46.

Figure 3:
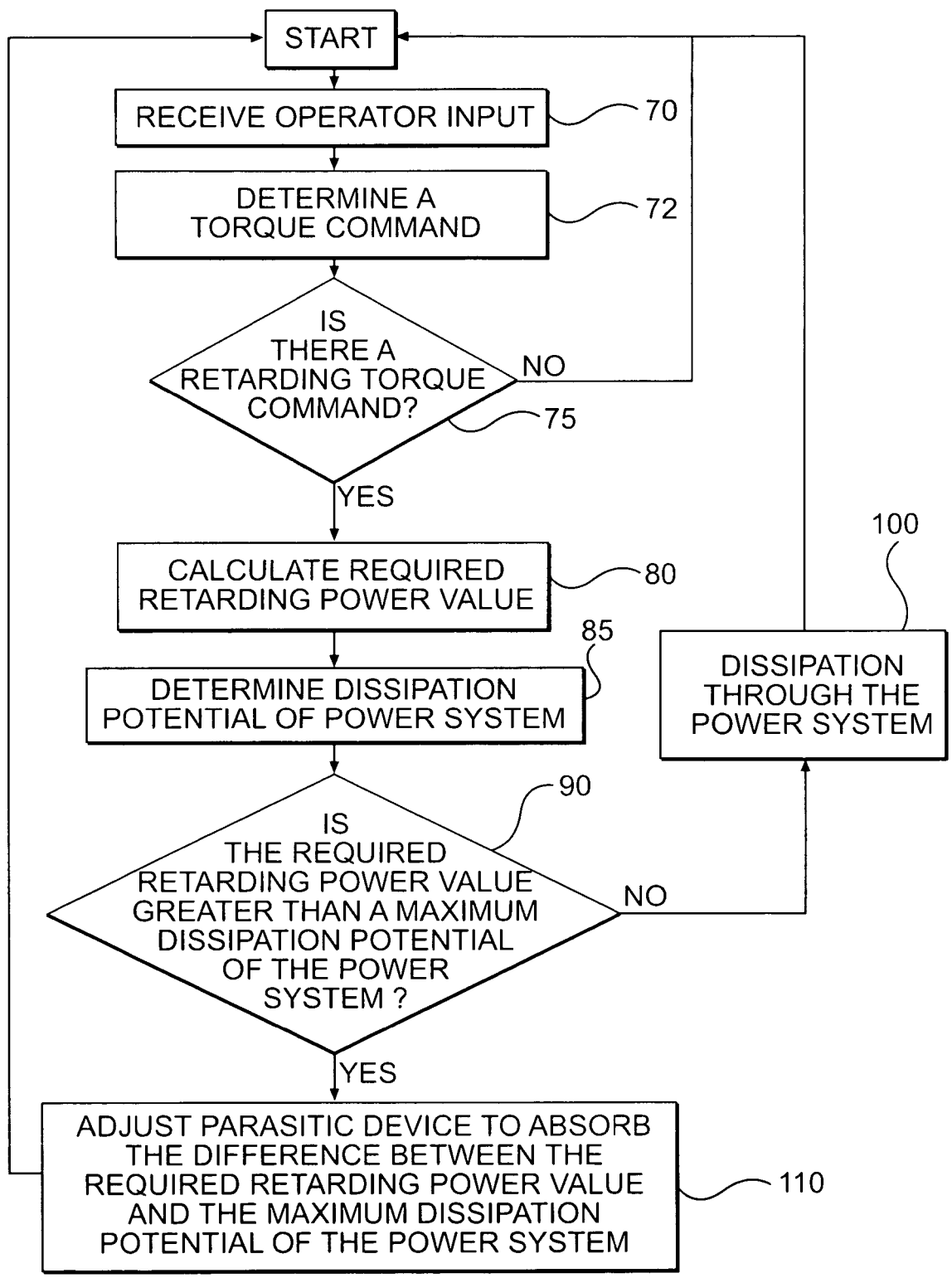
FIG. 3 is a flow diagram illustrating an exemplary method for operating the power system of FIG. 2.

FIG. 3 illustrates a method of retarding movement of a machine in accordance with an exemplary embodiment of the present disclosure. As illustrated, the method may begin when controller 60 receives input from the operator indicative of a desired speed of machine 10 (Step 70). In particular, operator may manipulate left pedal 22, right pedal 24, and/or FNR selector 26 to generate an signal indicative of the desired speed. The desired speed may include maintaining a particular positive speed of machine 10, decelerating to zero speed, or decelerating to zero speed and accelerating to positive speed in a direction opposite the movement of machine 10 (i.e., a direction shift from forward to reverse).

Upon receiving the signal indicative of the desired speed, controller 60 may be configured to determine a torque command (step 72). The torque command may be based on, for example, the difference between the desired speed of machine 10 and the actual output speed of transmission 28 sensed by sensor 54. Controller may determine if machine 10 is in a retarding condition based on the torque command (Step 75). For example, if the ground speed of machine 10 is sufficiently close to or less than the desired speed, no retarding of machine 10 is necessary. In such instances, controller 60 may not generate a retarding torque command. If, however, the ground speed is greater than the desired speed, retarding may be necessary to dissipate power from traction devices 12. In such instances, controller 60 may generate a retarding torque command and transmit the retarding torque command to transmission 28, so that transmission 28 may direct undesired power from traction devices 12 to power system 19.

Controller 60 may be configured to calculate the amount of power that machine 10 may be required to dissipate in order to reduce the ground speed of machine 10 to the desired speed. This value for the power will be hereinafter referred to as "required retarding power value" (step 80). Controller 60 may calculate the magnitude of the required retarding power value as a function of the retarding torque command (i.e., the desired output torque of driven element 32) and the actual speed of transmission 28 (i.e., the speed of driving element 30 corresponding to the speed of traction devices 12). Alternatively, actual speed of transmission 28 may be derived from the speed of the power source, ground speed, among other things.

Once the required retarding power value is determined, controller 60 may determine a strategy for dissipating the retarding power throughout machine 10. In particular, controller 60 may receive data from sensor 56 indicating the speed of power source 27. Controller 60 may also receive data from sensor 58 indicating the pressure/displacement of hydraulic pump 40. Controller may then derive, using one or more algorithms, the load applied by hydraulic pump 40 on power source 27. Controller 60 may use one or more look-up tables within controller 60 to determine the maximum dissipation potential associated with power system 19 (Step 85) based the power consumed by hydraulic pump 40 and the dissipation potential of power source 27 as the speed of power source 27 increases from the speed measured by sensor 56 to a maximum desirable engine speed. It is understood that the maximum dissipation potential for power system 19 may be a fixed or variable value.

Controller 60 may compare the required retarding power value to the maximum dissipation potential associated with power system 19 (step 90). If the maximum dissipation potential of power system 19 is greater than the required retarding power value, then transmission 28 may be controlled to drive crankshaft 42 of power source 27 and dissipate all of the retarding power through power system 19 (step 100). If, however, the required retarding power value exceeds the maximum dissipating potential of power system 19, then controller 60 may be configured to provide a signal, via communication line 69, to adjust a parasitic device to provide increased retarding power. For example, controller 60 may control cooling fan 46 to operate at an increased rate (step 110). More specifically, controller 60 may provide a signal to pump-flow modifying component (not shown) of variable displacement pump 52, to vary the flow rate of pressurized fluid supplied to hydraulic motor 48 driving cooling fan 46. The flow rate of pressurized fluid supplied to hydraulic motor 48 may be modulated so that cooling fan 46 may absorb the difference between the maximum dissipation potential of power system 19 and the required retarding power value. In this manner, power system 19 may obtain the required retarding power value while preventing the power source 27 from reaching and/or exceeding the maximum desired speed of power source 27.

It is understood that additional and/or alternative parasitic devices that can be triggered to dissipate power at an increased rate without affecting machine 10 may be employed in accordance with the present disclosure. The additional and/or alternative parasitic devices may embody an engine brake (not shown), hydraulic retarder (not shown), and/or any other device known to one skilled in the art. It is further understood that the method discussed above is exemplary and that the concept behind the method may be readily modified for use with, for example, an electric drive transmission system, mechanical transmission system, or other electric configurations.

INDUSTRIAL APPLICABILITY

The disclose method may be applicable to any machine having a power system capable of retarding power back to the power source. For example, the disclosed method may be applicable to mobile machines having a transmission capable of transferring torque from traction devices to an engine. In one embodiment, the machine may be a wheel loader having a continuous variable transmission (e.g., hydraulic continuously variable transmission, hydro-mechanical continuously variable transmission, electric drive transmission, etc).

The disclosed method may improve the retarding capability of a propelled machine 10. In particular, the disclosed method may adjust the magnitude of power consumed by cooling fan 46 as a function of the dissipation potential of power system 19, thus preventing the speed of power source 27 from exceeding a maximum desired speed. In this manner, the disclosed system and method may improve the retarding capability of power system 19 and reduce the length of time needed to retard machine 10 to a desired speed.

It will be apparent to those skilled in the art that various modifications and variations can be made in the disclosed method without departing from the scope of the disclosure. It is understood that the method discussed above is exemplary and that the concept behind the method may be readily modified for use with configurations. Other embodiments will be apparent to those skilled in the art from consideration of the specification disclosed herein. It is intended that the specification and examples be considered as exemplary only, with a true scope being indicated by the following claims and their equivalents.

What is claimed is:

1. A method for dissipating power through a machine, comprising:

determining a required retarding power, the required retarding power being an amount of power to be dissipated by the machine;

determining a maximum power dissipation potential of a power source of the machine; and directing a value of power equal to the maximum power dissipation potential of the power source into the power source and controlling a hydraulic pump of the machine to variably dissipate a value of power equal to a total difference between the required retarding power and the maximum power dissipation potential using a parasitic load of the machine when the required retarding power is greater than the maximum power dissipation potential.

2. The method of claim 1, wherein the maximum power dissipation potential is a fixed value.

3. The method of claim 1, wherein determining the required retarding power value includes determining the required retarding power value based on a user desired speed of the machine.

4. The method of claim 1, wherein the machine is a mobile machine and the parasitic load is a cooling fan.

5. The method of claim 1, wherein the determination of the required retarding power is triggered by an operator request for a propulsion direction change.

6. The method of claim 1, wherein determining a maximum power dissipation potential includes determining the maximum power dissipation potential based on a maximum desirable speed of the power source.

7. The method of claim 1, further including directing a value of power equal to the required retarding power into the power source for dissipation when the required retarding power is not greater than the maximum power dissipation potential.

8. A method for dissipating power through a machine, comprising:

directing power into a power system of the machine for dissipation;

determining a power dissipation potential of the power system; and controlling a hydraulic pump of the machine to variably dissipate a total amount of power in excess of the power dissipation potential when a total amount of power to be dissipated by the machine is greater than the power dissipation potential of the power system.

9. The method of claim 8, further including determining a required retarding power value based on a user desired speed of the machine.

10. The method of claim 9, wherein controlling the hydraulic pump includes adjusting a setting of the hydraulic pump to increase the magnitude of power consumed by one or more parasitic devices when the required retarding power value exceeds the maximum dissipation potential value.

11. The method of claim 10, wherein the one or more parasitic devices includes one or more devices that consumes power at a variable load.

12. The method of claim 9, wherein the maximum dissipation potential value is a function of a power dissipation limit of a power source.

13. The method of claim 8, wherein the determining of the dissipation potential value includes sensing a parameter indicative of a load applied to a power source of the power system and determining the dissipation potential of the power system based on the sensed load.

14. The method of claim 8, wherein the machine is a mobile machine and the power directed into the power system is a function of a desired mobile speed of the machine.

15. The method of claim 8, wherein controlling the hydraulic pump includes driving a cooling fan to dissipate power.

16. The method of claim 15, wherein directing power into the power system includes driving a power source of the machine to a speed limit of the power source.

17. A power system, comprising:
a power source operably coupled to a transmission;
a cooling fan operably coupled to the power source; and
a controller configured to:
cause the transmission to direct power into the power source;
determine a maximum power dissipation potential of the power source; and
control the cooling fan to variably dissipate a total amount of power in excess of the maximum power dissipation potential of the power source when an amount of power to be dissipated by the system is greater than the determined maximum power dissipation potential of the power source.

18. The power system of claim 17, wherein the maximum power dissipation potential value of the power source is a function of a dissipation limit of the power source.

19. The power system of claim 18, wherein the dissipation limit is a speed limit of the power source.

20. The power system of claim 17, wherein the transmission includes a hydraulic transmission.

* * * * *